C. A. STOREY.
MOVING PICTURE MACHINE.
APPLICATION FILED FEB. 26, 1913.
1,129,754.
Patented Feb. 23, 1915.
2 SHEETS—SHEET 1.
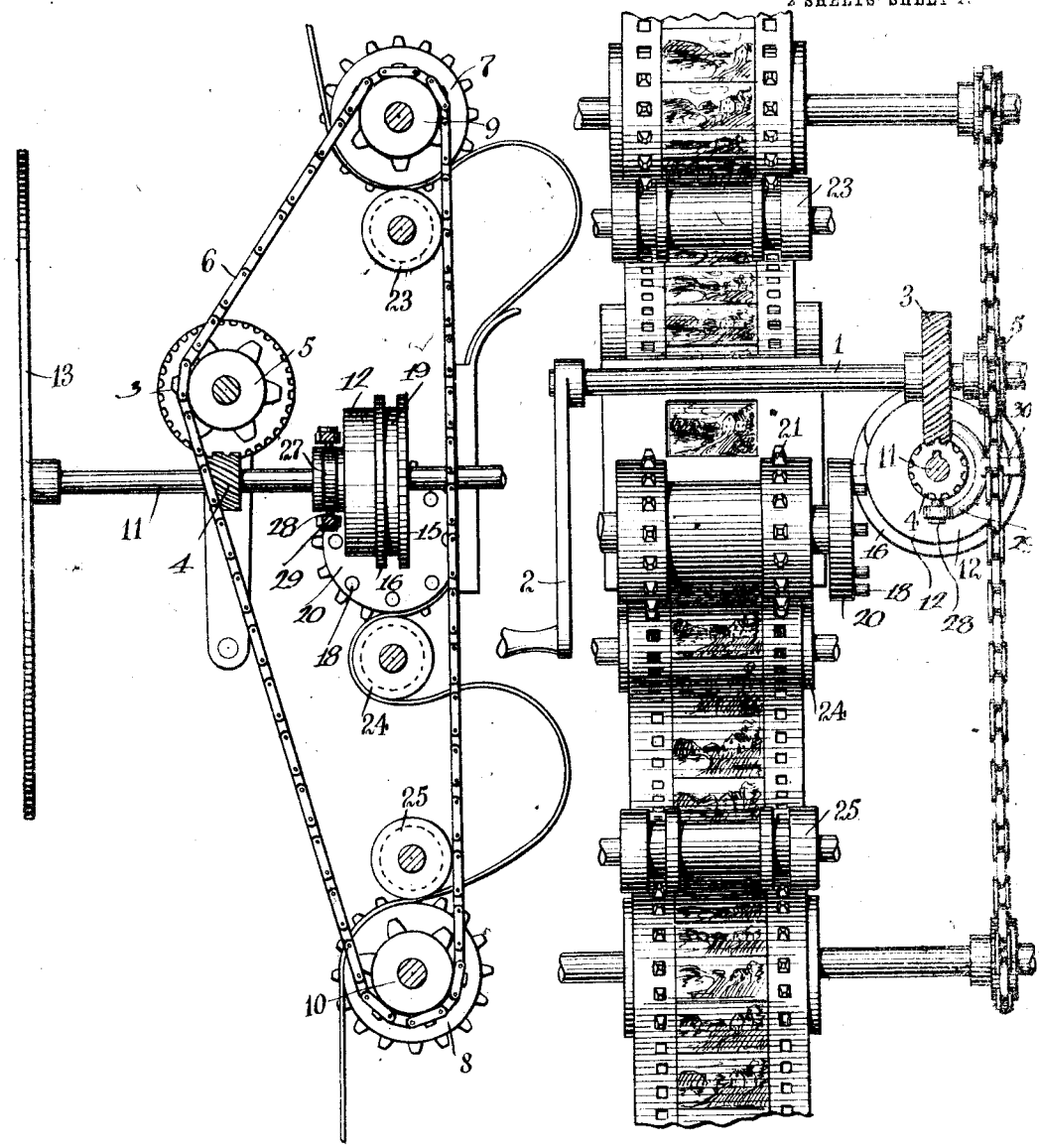
Fig_1_  Fig_2_
WITNESSES
Frank C. Palmer
O. D. Rollhaus
INVENTOR
Charles A. Storey
BY Munn & Co.
ATTORNEYS C. A. STOREY.
MOVING PICTURE MACHINE.
APPLICATION FILED FEB. 26, 1913.
1,129,754.
Patented Feb. 23, 1915.
2 SHEETS—SHEET 2.
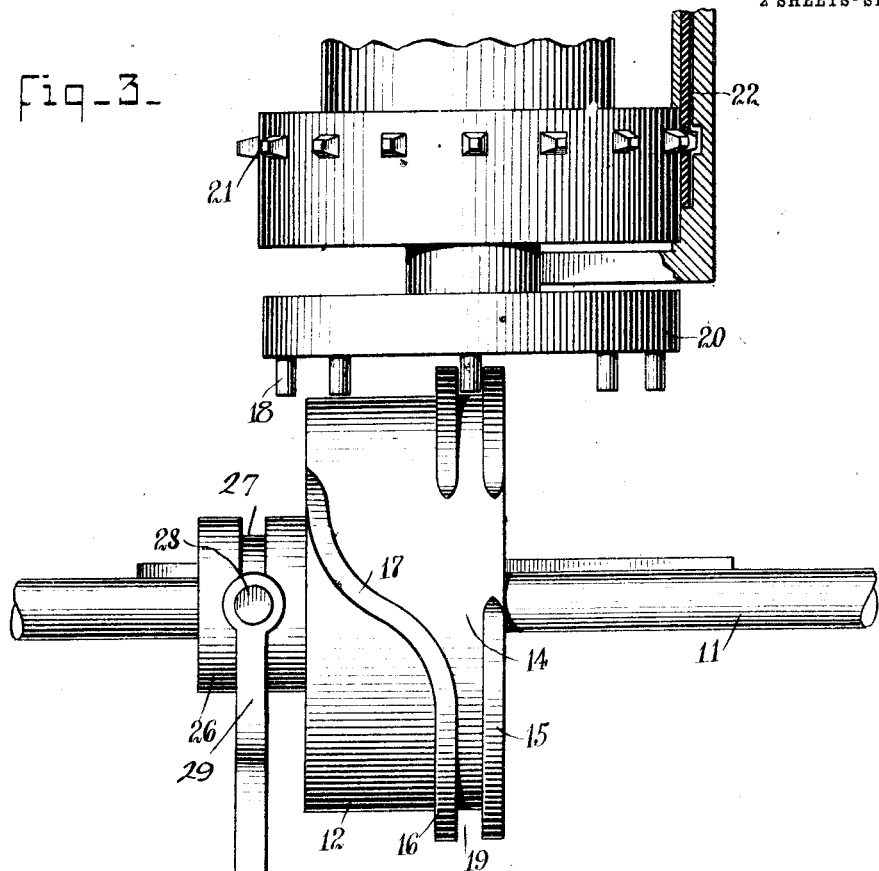
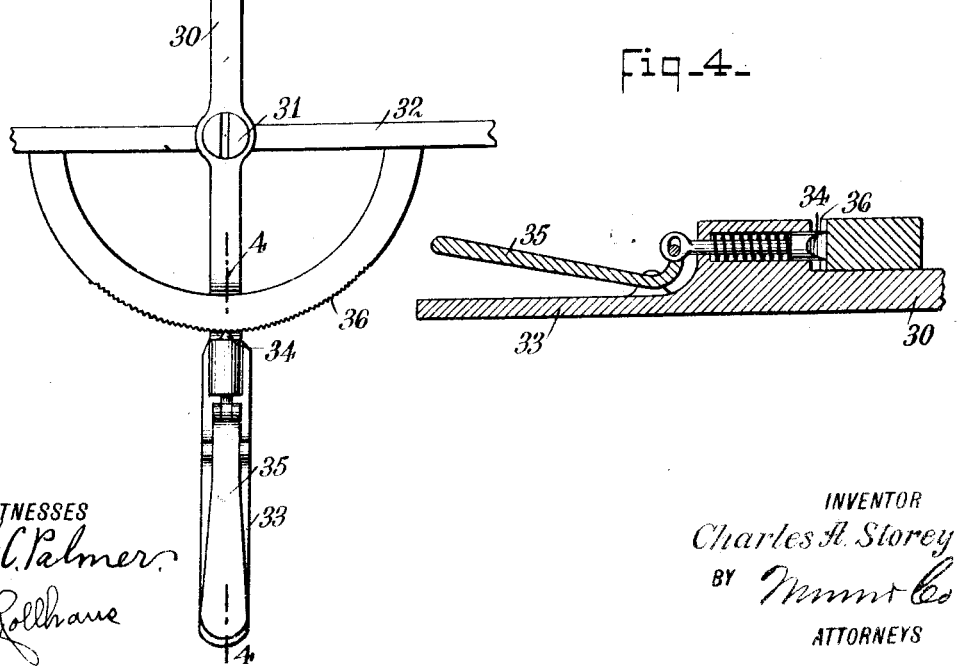
WITNESSES
Frank C. Palmer
C. D. Kollhaus
INVENTOR
Charles A. Storey
BY Munn & Co
ATTORNEYS

UNITED STATES PATENT OFFICE.

CHARLES ARTHUR STOREY, OF FORT ROBINSON, NEBRASKA.

MOVING-PICTURE MACHINE.

1,129,754.  Specification of Letters Patent.  Patented Feb. 23, 1915.

Application filed February 26, 1913. Serial No. 750,750.

*To all whom it may concern:*

Be it known that I, CHARLES A. STOREY, a citizen of the United States, and a resident of Fort Robinson, in the county of Dawes and State of Nebraska, have invented a new and Improved Moving-Picture Machine, of which the following is a full, clear, and exact description.

This invention relates to improvements in moving picture machines, and has for an object to provide an improved structure which will cause a proper movement of the film past or through a beam of light by a simple continuous moving structure which may be run at any desired speed, and which will cause the usual stationary period for the film at the right time.

A further object of the invention is to provide a feed in which the Geneva movement principle is eliminated, and a pin and cam structure substituted. This structure causes a quick change of pictures and a positive action of the various moving parts without jerking thereof.

A further object of the invention is to provide a simple structure in respect to the operating parts of the machine wherein most of the usual gear wheels are eliminated and shafts, sprocket wheels, and chains substituted, or certain parts entirely eliminated.

In carrying out the objects of the invention the various improved structures and the entire machine may be made of any desired size, as occasion may demand, and the device may be used not only to project so-called moving pictures, but be used as a camera, so that when the expression moving picture machine is used, it is to be understood that a camera structure is also intended to be covered. The intermittent sprocket wheel is connected with the pin wheel, which in turn is operated by a continuously moving cam formed with certain cam surfaces for causing one pin to be advanced quickly during part of the rotation of the cam wheel and then held stationary for the remaining rotation of the wheel. Associated with these structures are power operated means for actuating the cam and sprocket and chain structure for actuating the feed roller and the take up roller. By using a single pair of spiral gears and a sprocket chain, all of the usual gearing found in machines of this character are eliminated and a simple positive structure is produced.

A practical embodiment of the invention is represented in the accompanying drawings forming a part of this specification in which similar characters of reference indicate corresponding parts in all the views.

Figure 1 is a side view of the operating parts of a moving picture machine embodying the invention; Fig. 2 is a front view of the structure shown in Fig. 1; Fig. 3 is an enlarged plan view of the cam pin wheel and associated parts embodying certain features of the invention; and Fig. 4 is a fragmentary sectional view approximately on the line 4—4 of Fig. 3.

In the accompanying drawings only the operating parts of the machine are shown as any desired casing and supporting framework may be used without departing from the spirit of the invention.

Referring to the drawings by numerals, 1 indicates a main shaft to which an operating crank 2 is secured in any desired manner so that when crank 2 is turned the main shaft 1 and the various moving parts of the machine will be actuated. Shaft 1 has rigidly secured thereto a large spiral gear 3 meshing with a small spiral gear 4. The gear 3 is larger than gear 4 but it will be readily understood that the size of these gears could be changed without departing from the spirit of the invention, the particular proportion shown being found desirable. Rigidly secured to main shaft 1 is a sprocket wheel 5 designed to have the sprocket chain 6 run thereover whereby when shaft 1 is rotated, sprocket 5 moves chain 6 and consequently rotates the feed roller 7 and the take up roller 8. Suitable sprocket wheels 9 and 10 are connected with the respective rollers. In this way the power is readily transmitted to the continuously moving rollers which actuate the feed or intake and the take up or discharge of the film from the machine. The small spiral gear 4 which is in mesh with gear 3 is rigidly secured to the cam wheel shaft 11 so as to rotate the same. This shaft is supported in any desired manner in suitable bearings (not shown) and carries a cam wheel 12 and a shutter 13. The shutter 13 may be of any desired kind, as for instance, a three-wing shutter. The cam wheel 12 (Fig. 3) is provided with a body 14 and a substantially annular raised flange 15. Arranged adjacent flange 15 is a flange 16 which is spaced from flange 15 for substantially the same distance entirely around the periphery of the body 14, with the exception of a small portion thereof. At one end the flange 16 is bent at 17 to form a cam against which the respective pins 18 strike and are guided into the groove or camway 19 between flanges 15 and 16. During the contact of the respective pins 18 with the inclined or cam portion, the pin wheel 20 is being rotated or moved, and while the pins are traveling through the groove 19 the pin wheel 20 is stationary. The pin wheel 20 may be made of any desired size and contain any desired number of pins 18 though it will be understood of course that the same are to be spaced a correct distance apart for causing a correct movement of the intermittent film sprocket 21, upon each movement of pin along the cam face 17. The pins 18 are preferably made from hardened steel and substantially the only wear thereon is the contact with cam face 17 so that the life of the pins is considerable and also the movement of the pin wheel 20 is quick without the jerky action and is perfectly steady or stationary during the time that the picture is being held still. The intermittent sprocket roller 21 is of the usual type and will therefore need no additional description, and is adapted to engage the film 22 in the usual manner, the same being rigidly secured to pin wheel 20 in any desired manner. Associated with the rollers 7, 8 and 21 are idlers 23, 24 and 25, for properly holding the film when the same is in contact with the respective rollers (Fig. 1).

Cam wheel 12 is formed with an extending hub portion 26 which is provided with an annular groove 27 designed to be engaged by suitable pins 28 fitted into the bifurcated end 29 of a framing lever 30. The framing lever 30 is pivotally mounted at 31 on part of the frame 32 so that when the handle 33 is moved back and forth, lever 30 will move cam wheel 12 back and forth longitudinally of shaft 11, whereby the pin wheel 20 is caused to rotate or be advanced or retarded so as to properly frame or adjust the picture. Associated with handle 33 is a spring-pressed catch 34 operated by a suitable pivotally mounted gripping member 35, whereby catch 34 may be caused to engage any of the notches in rack 36 so as to lock the framing lever 30 in any of its adjusted positions. By this construction and arrangement the picture may be readily framed or adjusted at any time either while the machine is stationary or during the operation thereof. Also by the mounting of the shutter 13 on shaft 11, all intermediate wheels and lever mechanisms are eliminated and the shutter given a proper motion in respect to the picture.

Having thus described my invention I claim as new and desire to secure by Letters Patent:—

1. In a moving picture machine of the class described, the combination with an intermittent film sprocket roller, of a pin wheel rigidly secured thereto provided with a plurality of spaced pins extending therefrom parallel with the axis thereof, a cam member operating in a plane at right angles to the plane of rotation of said pin wheel, said cam member being provided with a cam structure having a gradual curve for intermittently moving said pin wheel without jerking, a continuously rotatable member for supporting and actuating said cam wheel, and a framing member associated with said cam wheel for shifting the cam wheel longitudinally of said rotatable member independently of the cam wheel whereby an extra movement of said pin wheel and the intermittent sprocket roller associated therewith is made for properly framing the film actuated by said sprocket wheel and said film sprocket roller.

2. In a moving picture machine of the class described, the combination with an intermittent film sprocket roller, of a pin wheel connected therewith, a rotatable cam engaging the pins of said pin wheel for intermittently moving the pin wheel, a continuously rotatable shaft for actuating said cam wheel, a pivotally mounted framing lever for sliding said cam longitudinally of said shaft for rotating said pin an extra distance and causing the proper action of the intermittent sprocket for framing a film properly.

3. In a moving picture machine of the class described, the combination with an intermittent sprocket, of an intermittent wheel connected therewith, a continuous rotatable cam for actuating said intermittent wheel, a continuously rotatable shaft supporting said cam, a pivotally mounted framing lever associated with said cam for moving said cam longitudinally of said shaft whereby said intermittent wheel is advanced an extra distance or retarded and said intermittent sprocket is moved for properly framing the film passing thereover, and means for locking said framing lever in any of its adjusted positions.

4. In a moving picture machine of the class described, the combination with an intermittent sprocket, of an intermittent wheel connected therewith, said intermittent wheel being formed with spaced pins extending therefrom normal to the side face thereof, a continuously rotating cam wheel arranged to operate at right angles to said pin wheel, said cam wheel being provided with a pair of spaced ridges whereby a guiding groove is provided, one of said ridges being provided with a gap, and the other of said ridges being formed with a compound curve opposite said gap so as to extend from its normal path to one side of the cam wheel, whereby the pins on said pin wheel are successively engaged and gradually moved over to the path provided by said ridges, this construction being such as to cause the movement of the pin wheel to begin gradually and stop gradually, a continually rotating shaft for supporting said wheel, whereby said cam wheel is rotated, and manually controlled means for sliding said wheel longitudinally of said shaft, whereby the cam wheel is moved relatively to the pin wheel for giving the pin wheel an extra movement, whereby the film actuated by the pin wheel is moved properly for causing the picture on the film to be properly framed.

In testimony whereof I have signed my name to this specification in the presence of two subscribing witnesses.

CHARLES ARTHUR STOREY.

Witnesses:
L. M. DAVIS,
J. R. SMITTONE.